US008639119B2

(12) United States Patent
Wen et al.

(10) Patent No.: US 8,639,119 B2
(45) Date of Patent: Jan. 28, 2014

(54) REMOTE NODE FOR WAVELENGTH-DIVISION-MULTIPLEXED PASSIVE OPTICAL NETWORK

(75) Inventors: Yang Jing Wen, Singapore (SG); Zhaowen Xu, Singapore (SG); Xiaofei Cheng, Singapore (SG); Yixin Wang, Singapore (SG)

(73) Assignee: Agency for Science, Technology and Research, Connexis (SG)

( * ) Notice: Subject to any disclaimer, the term of this patent is extended or adjusted under 35 U.S.C. 154(b) by 229 days.

(21) Appl. No.: 12/935,805

(22) PCT Filed: Mar. 31, 2009

(86) PCT No.: PCT/SG2009/000117
§ 371 (c)(1),
(2), (4) Date: May 27, 2011

(87) PCT Pub. No.: WO2009/123572
PCT Pub. Date: Oct. 8, 2009

(65) Prior Publication Data
US 2011/0222857 A1  Sep. 15, 2011

Related U.S. Application Data

(60) Provisional application No. 61/040,829, filed on Mar. 31, 2008.

(51) Int. Cl.
*H04J 14/00* (2006.01)
*H04J 14/02* (2006.01)
(52) U.S. Cl.
USPC ............... 398/79; 398/66; 398/65; 398/72; 398/87

(58) Field of Classification Search
USPC ............... 398/110, 66, 65, 68, 72, 79, 82, 87
See application file for complete search history.

(56) References Cited

U.S. PATENT DOCUMENTS 5,572,612 A * 11/1996 Delavaux et al. ............... 385/24
5,778,014 A *  7/1998 Islam ............................... 372/6
(Continued)

FOREIGN PATENT DOCUMENTS

KR   20080099056   11/2008
WO   2008047996    4/2008

OTHER PUBLICATIONS

Elaine Wong, Member, IEEE, Ka Lun Lee, Member, IEEE, and Trevor B. Anderson, Member, IEEE "Directly Modulated Self-Seeding Reflective Semiconductor Optical Amplifiers as Colorless Transmitters in Wavelength Division Multiplexed Passive Optical Networks" Journal of Lightwave Technology, vol. 25, No. 1, Jan. 2007.*

(Continued)

*Primary Examiner* — Ken Vanderpuye
*Assistant Examiner* — Abbas H Alagheband
(74) *Attorney, Agent, or Firm* — Michael Best & Friedrich LLP (57) ABSTRACT

A remote node for a wavelength-division-multiplexed passive optical network (WDM PON). The remote node comprises means for receiving uplink optical signals from one or more optical network units of the WDM PON; a broadband reflector for reflecting a self-seeding portion of the respective uplink optical signals to the respective uplink light sources; and wherein the reflector comprises a gain medium and is configured for receiving a pump optical signal from a central office of the WDM PON for amplifying the self seeding portion of the respective uplink optical signal.

6 Claims, 8 Drawing Sheets

(56) References Cited

U.S. PATENT DOCUMENTS

| | | | |
|---|---|---|---|
| 6,507,431 B1* | 1/2003 | Sugaya et al. | 359/341.32 |
| 6,694,273 B2* | 2/2004 | Kurooka et al. | 702/69 |
| 7,386,235 B2* | 6/2008 | Jennen et al. | 398/72 |
| 7,646,978 B2* | 1/2010 | Lee et al. | 398/63 |
| 8,224,183 B1* | 7/2012 | Iannone et al. | 398/68 |
| 2002/0044322 A1* | 4/2002 | Blumenthal et al. | 359/161 |
| 2003/0021302 A1* | 1/2003 | Grudinin et al. | 372/6 |
| 2004/0067059 A1* | 4/2004 | Song et al. | 398/82 |
| 2004/0071399 A1* | 4/2004 | Jung et al. | 385/31 |
| 2004/0175177 A1* | 9/2004 | Lee et al. | 398/72 |
| 2005/0074240 A1* | 4/2005 | Jung et al. | 398/72 |
| 2005/0135438 A1* | 6/2005 | Kim et al. | 372/6 |
| 2005/0163503 A1* | 7/2005 | Lee et al. | 398/19 |
| 2006/0153566 A1* | 7/2006 | Sorin et al. | 398/72 |
| 2006/0209394 A1* | 9/2006 | Papernyi et al. | 359/341.33 |
| 2006/0239683 A1* | 10/2006 | Park et al. | 398/71 |
| 2008/0175592 A1* | 7/2008 | Dai | 398/87 |
| 2008/0193132 A1* | 8/2008 | Matsui et al. | 398/79 |
| 2009/0220230 A1* | 9/2009 | Kim et al. | 398/72 |
| 2010/0119232 A1* | 5/2010 | Byun et al. | 398/83 |
| 2012/0020616 A1* | 1/2012 | Babi et al. | 385/27 |

OTHER PUBLICATIONS

Jung Mi Oh, Sang Geun Koo, Donghan Lee, and Soo-Jin Park "Enhancement of the Performance of a Reflective SOA-Based Hybrid WDM/TDM PON System With a Remotely Pumped Erbium-Doped Fiber Amplifier" Journal of Lightwave Technology, vol. 26, No. 1, Jan. 1, 2008.*

Hyun Deok Kim et al., "A Low-Cost WDM Source with an ASE injected Fabry-Perot Semiconductor Laser", IEEE Photonic Technology Letters, vol. 12, No. 8, Aug. 2000.*

E. Wong, et al., "Low-cost WDM passive optical network with directly-modulated self-seeding reflective SOA," Electronics Letters, vol. 42, No. 5, Mar. 2, 2006 (2 pages).

* cited by examiner

REMOTE NODE FOR WAVELENGTH-DIVISION-MULTIPLEXED PASSIVE OPTICAL NETWORK

FIELD OF INVENTION

The present invention relates broadly to a remote node for a wavelength-division-multiplexed passive optical network (WDM PON), to a WDM PON and to a method of amplifying self-seeding portions of respective uplink optical signals in a WDM PON.

BACKGROUND

Passive optical network (PON) is a promising approach to meet the ever-increasing bandwidth demand from enterprises and households. PON can be based on different architectures, including but not limited to, Ethernet PON, Gigabit PON, wavelength division multiplexed (WDM) PON. Among these architectures, the WDM-PON is considered as a favourable broadband access solution since dedicated wavelengths are allocated to establish an ultra-wideband bi-directional link between the central office (CO) and each customer. Furthermore, the WDM-PON is cost-effective in the sense that the long feeder fiber used within the network is shared by a large number of customers, whilst offering additional features such as channel independence and per-customer based flexible upgrade. In this type of PON, a cost effective light source, particularly at the optical network unit (ONU) side, is a key component for the practical implementation of the network.

A low cost light source, particularly the uplink light source at ONUs, is the key element for the practical implementation of WDM-PONs. Light sources including spectrum-sliced light-emitting diodes (LEDs), spectrum-sliced free running Fabry-Perot laser diodes (FPLDs) and injection locked FPLDs using spectrum sliced amplified spontaneous emission (ASE) noise and a system exploiting the remodulation of downstream signals received at the ONUs have been considered for the implementation of cost-effective WDM-PONs. Although most of these schemes eliminate the need for wavelength-specific optical transmitters at the customer premises, each scheme has its own drawbacks. The scheme using the LEDs suffers from low power budget while the scheme comprising spectrum slicing of a free-running FPLD suffers from strong intensity noise. The injection locking of FPLDs using spectrum sliced ASE requires high ASE power for high bit rate operation while the re-modulation scheme needs further development to suppress the crosstalk from the residual downlink data and also to alleviate the dependence of the polarization state of the downlink data.

The concept of using amplified spontaneous emission (ASE) directly as uplink light source has also been proposed for the WDM transmission system. However, as a result of the noise characteristics of the ASE light sources, the transmission performances of the system are limited in terms of bitrate, distance and receiver sensitivity, amongst others.

Figure 1:
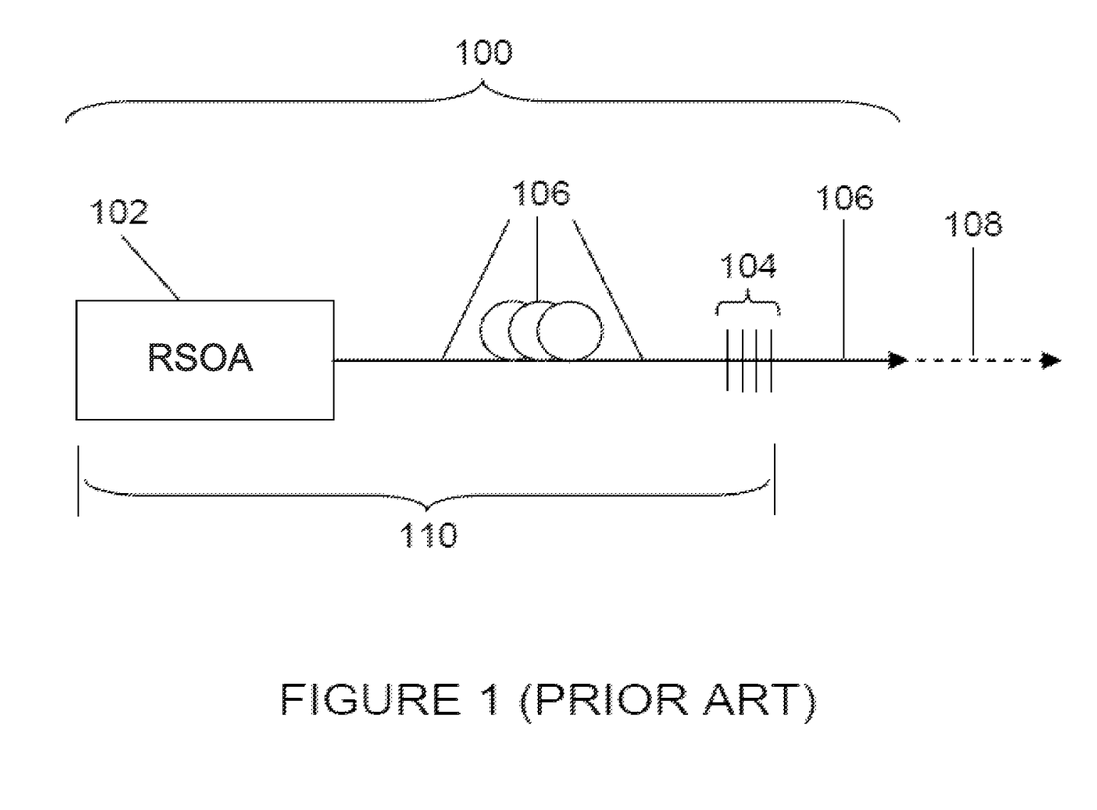
FIG. 1 shows a schematic diagram illustrating an optical network unit (ONU) light source comprising a reflective semiconductor optical amplifier (RSOA) and a fiber Bragg grating (FBG), according to the prior art.

A recent US patent to Jea-Hyuck Lee et. al., Publication No. US 2004/0175177 A1, proposed using self-seeded reflective semiconductor optical amplifiers (RSOAs) as optical network unit (ONU) light sources. In this scheme, as shown in FIG. 1, the ONU light source or transmitter 100 consists of a reflective semiconductor optical amplifier (RSOA) 102 and a reflection-type optical fiber Bragg grating (FBG) 104 located at a predetermined distance from the semiconductor optical amplifier 102 along the fiber 106. During operation, the optical transmitter 100 transmits an output light 108 of a preset wavelength resonating between the RSOA 102 and the reflection-type optical FBG 104. This occurs as a laser cavity 110 is formed between the RSOA 102 and the FBG 104, whereby only the light having a wavelength within the reflective spectrum of the FBG 104 is oscillated to achieve single mode operation. As a result of the broad spectrum of the RSOA 102, the operation wavelength of the ONU light transmitter 100 can be determined by the resonant wavelength of the FBG 104. The wavelength of the output light 108 can be tunable by using different FBGs with different resonant wavelengths. Alternatively, the resonant wavelength of a single FBG can be tuned to produce output light of different wavelengths via changes in temperature and/or pressure. In both scenarios, the stability of the FBG(s) will be a critical challenge for practical implementation.

Figure 2:
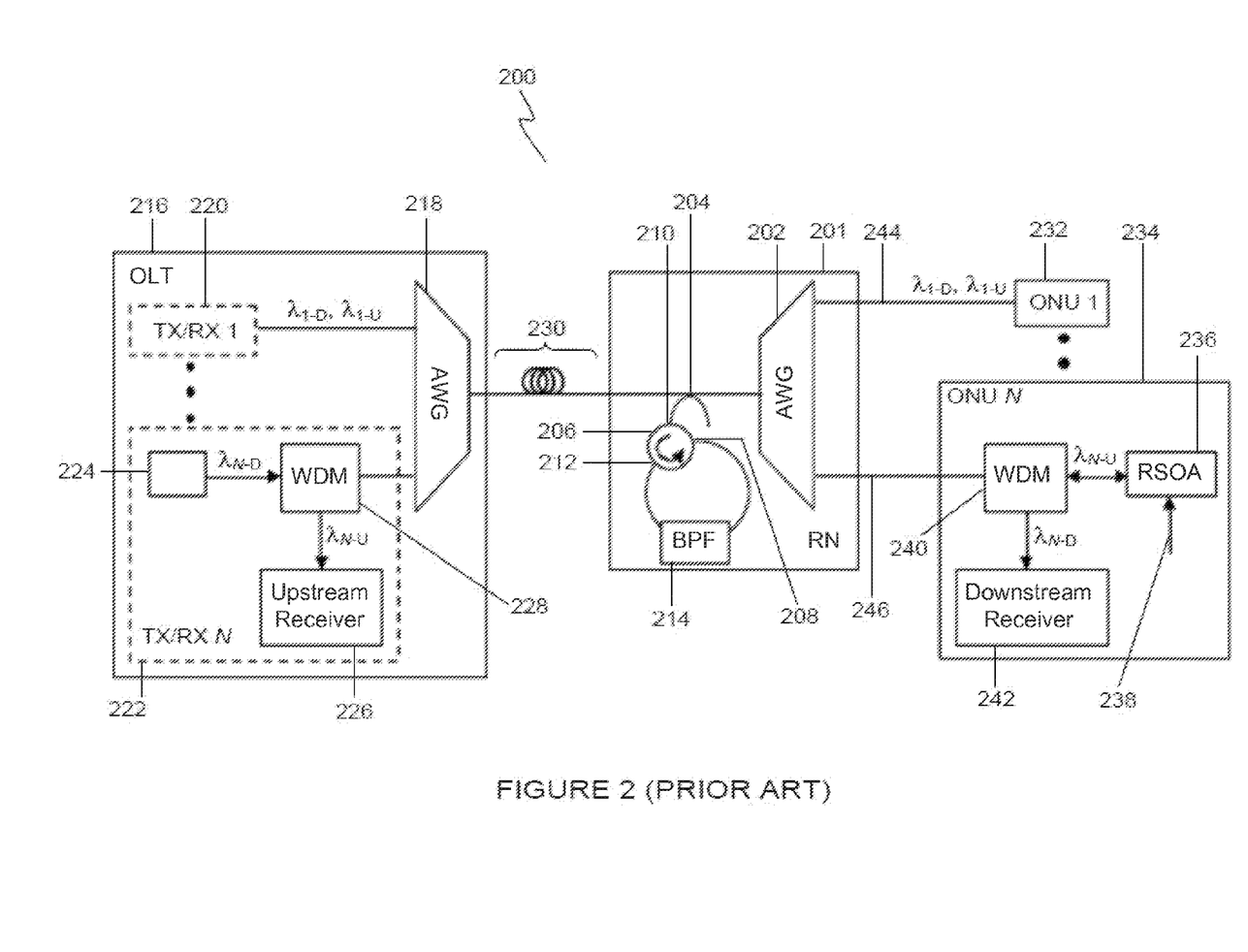
FIG. 2 shows a schematic diagram illustrating an architecture of a wavelength division multiplexed-passive optical network (WDM-PON) with directly modulated self-seeding RSOA, according to the prior art.

In order to improve the stability and better arrange the wavelength of the WDM-PON, a modified network architecture 200 has been proposed by E. Wong et. al., Electronics Letters, Vol. 42, No. 5, 2 Mar. 2006, as shown in FIG. 2. The architecture 200 comprises a remote node (RN) 201 consisting of a cyclic arrayed waveguide grating (AWG) 202, an optical coupler 204, an optical circulator 206 with three ports 208, 210, 212 and a bandpass filter (BPF) 214. The architecture 200 also comprises an optical line terminal (OLT) 216, consisting of an arrayed waveguide grating (AWG) 218 and a number of transmitter/receiver modules, e.g. 220, 222, whereby each transmitter/receiver module, e.g. 220, 222, comprises a transmitter 224, an upstream receiver 226 and a wavelength division multiplexed (WDM) filter 228. The OLT 216 is connected to the RN 201 via a feeder fiber 230. The architecture further comprises a number of optical network units (ONUs), e.g. 232, 234, whereby each ONU, e.g. 232, 234, comprises a reflective semiconductor optical amplifier (RSOA) 236 receiving upstream data 238 as the input, a wavelength division multiplexed (WDM) filter 240 and a downstream receiver 242. Each ONU, e.g. 232, 234, is connected to the RN 201 via a distribution fiber, e.g. 244, 246.

Within the network architecture 200, the downstream signals ($\lambda_{1\text{-}D}$, $\lambda_{N\text{-}D}$) and the upstream signals ($\lambda_{1\text{-}U}$, $\lambda_{N\text{-}U}$) are separated into wavebands that are spaced at a multiple of the free spectral range (FSR) of the AWGs, e.g. 202, 218. These wavebands are combined and separated by WDM filters, e.g. 228, 240, at the optical line terminal (OLT) 216 and the optical network units (ONUs), e.g. 232, 234, respectively. At each ONU, e.g. 232, 234, an RSOA, e.g. 236 emits a broadband amplified spontaneous emission (ASE) spectrum which is spectrally sliced by the AWG, e.g. 202, 218, in the upstream direction, and the BPF 214 ensures that only one spectrally sliced light per output port is passed through and reflected back to each RSOA, e.g. 236, within the ONUs, e.g. 232, 234, for self-seeding. As a result of the double passed insertion loss from the AWG 202 and the coupler 204 in the RN 201, an optical amplifier (not shown) is incorporated into the RN 201 to provide gain for the feedback signals. However, incorporating active components at the RN 201 is not desirable for the practical network implementation and should be avoided.

A need therefore exists to provide a remote node for a WDM PON, a WDM PON and a method of amplifying self-seeding portions of respective uplink optical signals in a WDM PON that seek to address at least one of the above-mentioned problems.

SUMMARY

According to a first aspect of the present invention there is provided a remote node for a wavelength-division-multiplexed passive optical network (WDM PON), the remote node comprising means for receiving uplink optical signals from one or more optical network units of the WDM PON; a broadband reflector for reflecting a self-seeding portion of the respective uplink optical signals to the respective uplink light sources; and wherein the reflector comprises a gain medium and is configured for receiving a pump optical signal from a central office of the WDM PON for amplifying the self seeding portion of the respective uplink optical signal.

The broadband reflector may further comprise a 4 port coupler with two output ports connected by a waveguide comprising the gain medium.

The waveguide may comprise an Erbium doped fibre (EDF).

One input port of the coupler may be configured for receiving said self-seeding portions of the respective uplink optical signals.

Another input port of the coupler may be configured for receiving the pump optical signal.

The broadband reflector may comprise a circulator with two adjacent ports connected by a waveguide comprising the gain medium.

The waveguide may comprise an Erbium doped fibre (EDF).

Another port of the circulator may be configured for receiving said self-seeding portions of the respective uplink optical signals.

The remote node may further comprise a coupler disposed at one end of the waveguide configured for receiving the pump optical signal.

The means for receiving the uplink optical signals may comprise an arrayed waveguide grating.

According to a second aspect of the present invention there is provided a wavelength-division-multiplexed passive optical network (WDM PON) comprising one or more of optical network units, each optical network unit comprising an uplink light source configured to transmit an uplink optical signal; a remote node configured to receive the uplink optical signals from the one or more optical network units and comprising a broadband reflector for reflecting a self-seeding portion of the respective uplink optical signals to the respective uplink light sources, wherein the reflector comprises a gain medium; and a central office comprising a pump source for generating a pump optical signal and configured to transmit the pump optical signal to the remote node to pump the gain medium of the broadband reflector for amplifying said self seeding portion of the uplink optical signal.

According to a third aspect of the present invention there is provided a method of amplifying self-seeding portions of respective uplink optical signals in a wavelength-division-multiplexed passive optical network (WDM PON), the method comprising the steps of receiving the uplink optical signals from one or more optical network units of the WDM PON at a remote node of the WDM PON; reflecting the respective self-seeding portions of the uplink optical signals to the respective uplink light sources; and amplifying the self seeding portions using a gain medium of the reflector and a pump optical signal received from a central office of the WDM PON.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

In the present invention, example embodiments have been developed to address the challenges faced by the network architectures of the prior art of FIGS. 1 and 2. Example embodiments of the present invention generally relate to wavelength division multiplexed-passive optical network (WDM-PON) light sources based on self-seeded reflective semiconductor optical amplifiers (RSOAs). Typically, the RSOA is self-seeded by an amplified spontaneous emission (ASE) through the use of a reflector without the use of any additional optical source.

In example embodiments, a lasing cavity is generally formed between the RSOA and the remote node (RN) via the use of a broadband reflector. The wavelength selection process is achieved by an arrayed waveguide grating (AWG) for spectrum slicing and the induced insertion loss is compensated by an erbium doped fiber (EDF) pumped by a centralized pump light located at the central office (CO). Example embodiments of the present invention further provide Raman amplification for the uplink and/or the downlink signals.

Figure 3:
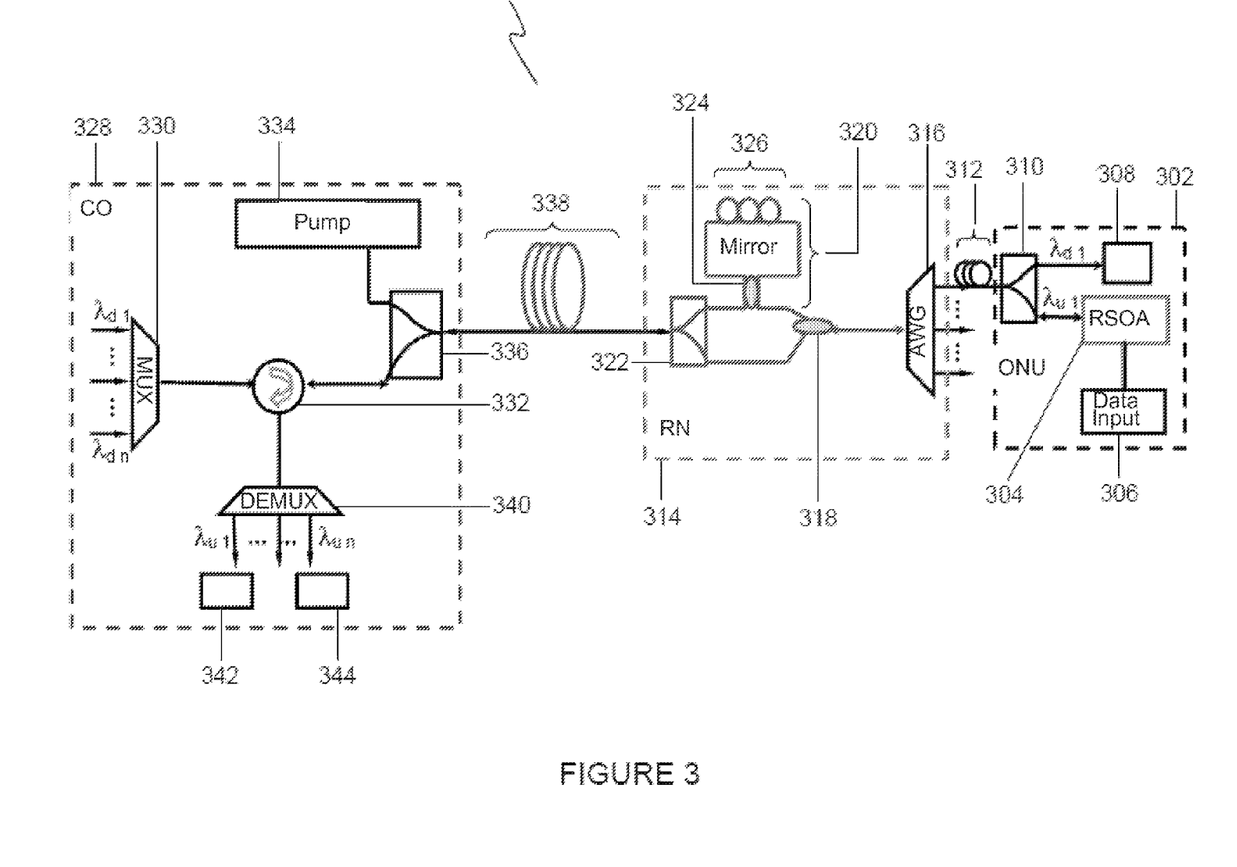
FIG. 3 shows a schematic diagram illustrating an architecture of a wavelength division multiplexed-passive optical network (WDM-PON) based on self-seeded reflective semiconductor optical amplifiers (RSOAs), according to an embodiment of the present invention.

FIG. 3 shows a schematic diagram illustrating a wavelength division multiplexed-passive optical network (WDM-PON) architecture 300 based on self-seeded reflective semiconductor optical amplifiers (RSOAs), according to an embodiment of the present invention. It should be appreciated that there are a number of individual optical network units (ONUs) present within the architecture 300 but only a single representative ONU 302 is shown for clarity and illustration purposes. The configurations of the remaining ONUs are similar to that of the representative ONU 302 as shown in FIG. 3 and the descriptions of the operation and function of the ONU 302 hereinafter apply similarly to the other remaining ONUs.

A WDM-PON architecture generally comprises a remote node (RN) connected to a single central office (CO). However, it should be appreciated that a number of remote nodes (RNs) may be connected to a single central office when the output power of the Raman pump located at the CO is relatively high for sharing by a number of RNs.

In the wavelength division multiplexed-passive optical network (WDM-PON) architecture 300 of FIG. 3, at the optical network unit (ONU) 302, the output ($\lambda_{u\,1}$) of the RSOA 304, which is directly modulated by the data input 306, is sent to the remote node (RN) 314 via the distribution fiber 312. In example embodiments, the data rate of the data input 306 is approximately 1.25 Gb/s but it will be appreciated that other data rates may be used. One end of the distribution fiber 312 is connected to the RN 314 and the other end of the fiber 312 to the WDM coupler/filter 310 of the ONU 302. In example embodiments, the WDM coupler 310 separates the downlink ($\lambda_{d\,1}$) and combines the uplink ($\lambda_{u\,1}$) signals. The downlink signals are defined as signals transmitting in the direction from the central office (CO) 328 to the ONUs, e.g. 302, while the uplink signals are defined as signals transmitting in the reverse direction. The uplink signal ($\lambda_{u\,1}$) is combined with other uplink signals from the uplink channels from other ONUs by the cyclic arrayed waveguide grating (AGW) 316 located at the RN 314. The AWG 316 selects the wavelength of each channel by removing the amplified spontaneous emission (ASE) noise from the RSOA 304 that is outside the passband of the AWG 316. The ASE noise is defined as light noise produced by spontaneous emission when a gain medium is pumped to produce a population inversion.

In example embodiments, the uplink signals transmitted by the AWG 316 are divided by the fiber coupler 318, whereby a portion of the uplink signals is inputted into the fiber loop mirror 320, which has been designed to have a 100% reflection for the uplink waveband. The reflected signals from the fiber loop mirror 320 are sent back to the RSOA 304 at the ONU 302, via the fiber coupler 318, the AWG 316, the distribution fiber 312 and the WDM filter 310, to form a laser cavity between the reflector (the loop mirror 320) and the RSOA 304. Similar laser cavities are formed between the loop mirror 320 and the respective RSOAs of the other ONUs within the architecture 300. As a result, single mode operation for each channel relating to individual ONUs, e.g. 302, can be achieved using this architecture 300.

In example embodiments of the present invention, in the uplink transmission, a portion of the uplink signals are sent via the coupler 318, the WDM coupler 322 and the feeder fiber 338 to the central office (CO) 328. At the CO 328, the uplink signals ($\lambda_{u\,1}, \ldots, \lambda_{u\,n}$) are demultiplexed by the demultiplexer (DEMUX) 340 and detected by individual uplink receivers, e.g. 342, 344.

In example embodiments, in the central office (CO) 328, the downlink signals ($\lambda_{d\,1}, \ldots, \lambda_{d\,n}$) are multiplexed together by the multiplexer (MUX) 330 and outputted via the circulator 332 towards the WDM coupler/filter 336. At the WDM coupler 336, the downlink signals ($\lambda_{d\,1}, \ldots, \lambda_{d\,n}$) are combined with the output of a Raman pump 334. In example embodiments, the Raman pump operates at the wavelength of 1480 nm but it will be appreciated that other operational wavelengths may be possible. The output from the WDM coupler 336 is then transmitted over the feeder fiber 338 to the RN 314. In example embodiments, the Raman pump 334 provides Raman gain for the uplink and/or the downlink signals.

At the RN 314, the downlink signals and the residual pumping light are separated by the WDM coupler 322. The downlink signals are transmitted directly to the coupler 318 while the residual Raman pump light is launched into the loop mirror 320 to provide gain for feedback signals. The amplification process is advantageous as the cavity feedback signals pass through the AWG 316 and the coupler 318 twice and consequently suffer from relatively high insertion loss.

The downlink signals are combined with the feedback signals from the loop mirror 320 and sent to the various ONUs, e.g. 302, for downlink detection. At the ONU 302 the downlink signal ($\lambda_{u\,1}$) is separated from the feedback signals by the WDM filter 310 and received by the receiver 308.

It should be appreciated that the number of downlink and uplink signals, the number of ONUs, the data rate of the data input 306, the configuration of the couplers 318, 324 and the wavelength of the Raman pump 332 may vary depending on the required architecture in the implementation of the WDM-PON, compared to the example embodiments described herein, without departing from the spirit or scope of the invention.

In the example embodiment of FIG. 3, the reflection at the RN 314 is realized by the loop mirror 320, comprising the four-port fiber coupler 324, with two of its output ports connected to a segment of the erbium doped fiber (EDF) 326. The EDF 326 is remotely pumped by the output of the pump 334 located at the central office (CO) 328. In example embodiments, in order to realize total reflection at the 1550 nm waveband where the EDF 326 exhibits gain, the fiber coupler 324 preferably has a 3 dB coupling ratio at this waveband. The coupling ratio for the wavelength of the pump 334, could be practically slightly different during implementation, but this does not affect the total power input into the loop mirror 320, whereby one part of the power is used for forward pumping and the other part for backward pumping within the loop mirror 320. The relatively slight difference in the coupling ratio also has relatively minimal effect on the reflectivity of the loop mirror 320 for the 1550 nm waveband.

Figure 4:
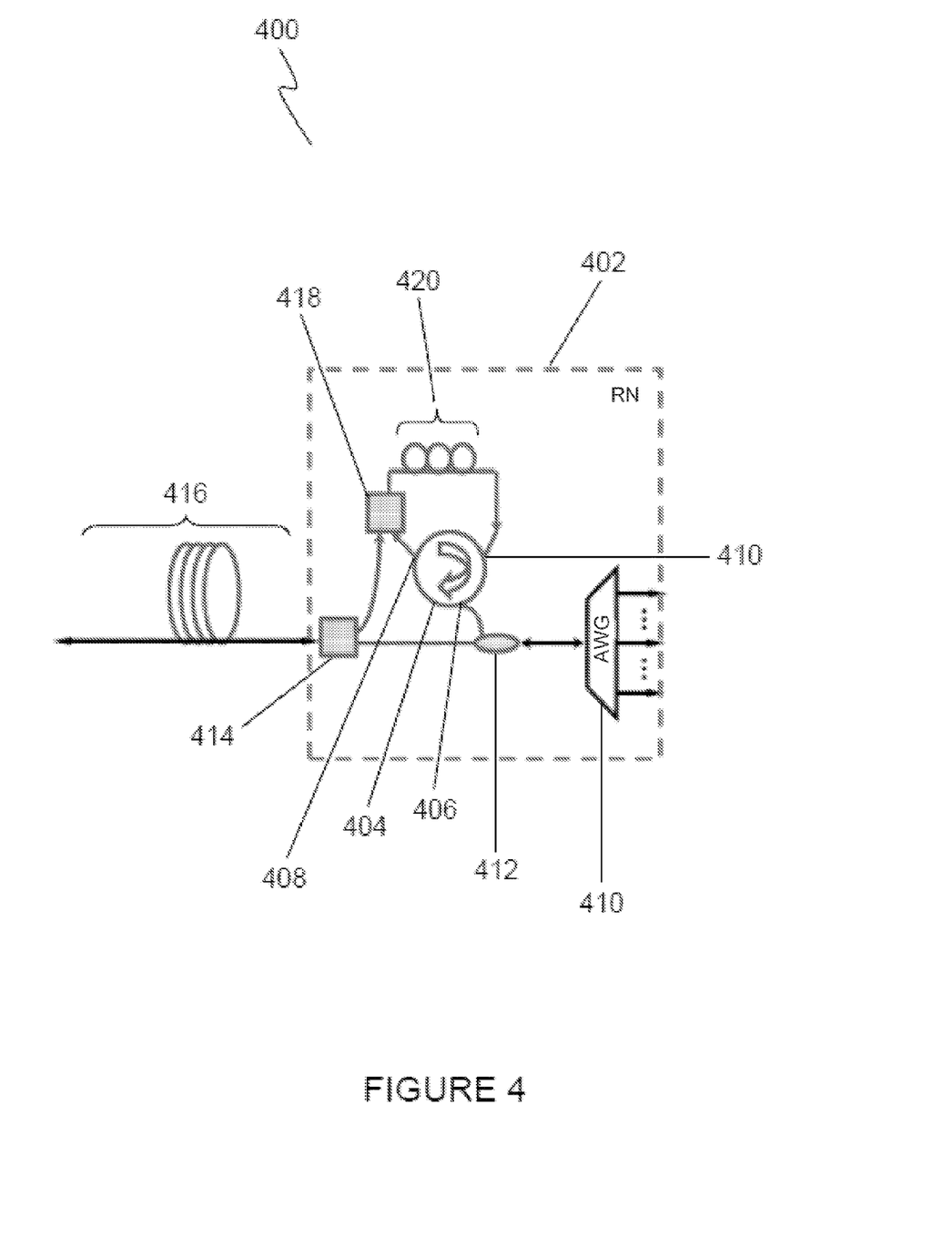
FIG. 4 shows a schematic diagram illustrating an architecture of a remote node with a circulator for a wavelength division multiplexed-passive optical network (WDM-PON), according to an embodiment of the present invention.

FIG. 4 shows a schematic diagram illustrating an architecture 400 of a remote node 402 with a circulator 404 for a wavelength division multiplexed-passive optical network (WDM-PON), according to another embodiment of the present invention. As an alternative to the configuration of the RN 314 of FIG. 3, the reflection at the RN 402 is realized by using the full circulator 404 with three ports 406, 408, 410, as shown in FIG. 4. It should be appreciated that a four-port non-full circulator may also be used. Uplink signals from the various ONUs (not shown) are multiplexed by the AWG 410 and transmitted to the coupler 412. Part of the uplink signals is sent into port one 406 of the circulator 404 while the remaining portion of the uplink signals is sent to the WDM coupler 414 for onward transmission via the feeder fiber 416 to the CO (not shown). The signals arriving at port one 406 are passed to port two 408 of the circulator 404 and are then combined with the output of the pump (not shown) by the WDM coupler 418. The combined signals and pump output are then launched into the EDF 420, where the signals are amplified and sent back to the RSOAs (not shown) via port three 410 and port one 406 to form a laser cavity for each channel relating to each individual ONU (not shown).

In example embodiments, the WDM coupler 418 is located at the input end of the EDF 420, as shown in FIG. 4. The coupler 418 acts as an optical combiner to combine the pump signal from the CO (not shown) and part of the uplink multiple wavelength signals for launch into the EDF and also as a bandpass filter to remove noise from the pump signal and the uplink multiple wavelength signals. It should be appreciated that the WDM coupler 418 may e.g. be replaced by a 3-dB optical coupler in another embodiment.

In example embodiments of the present invention, as shown in FIGS. 3 and 4, it should be appreciated that different wavelengths for the pump output at the central office (CO), e.g. 328 (FIG. 3), can be used. In order to achieve a relatively high pumping efficiency for EDF amplification, a pump wavelength of approximately 1480 nm is preferred, in order to provide Raman gain at the L band, defined as the wavelength range of 1565-1625 nm. However, a pump wavelength of approximately 1450 nm is preferred in order to provide Raman gain at the C band, defined as the wavelength range of 1530-1565 nm, whilst still maintaining a relatively sufficient pumping efficiency for EDF amplification. Multiple Raman pump lights with various power levels and wavelengths can also be used to provide flat Raman gain for the C band and/or the L band. Raman amplification is particularly preferred when the feeder fibre, e.g. 338 (FIG. 3), 416 (FIG. 4) has a length beyond 50 km.

Figure 5:
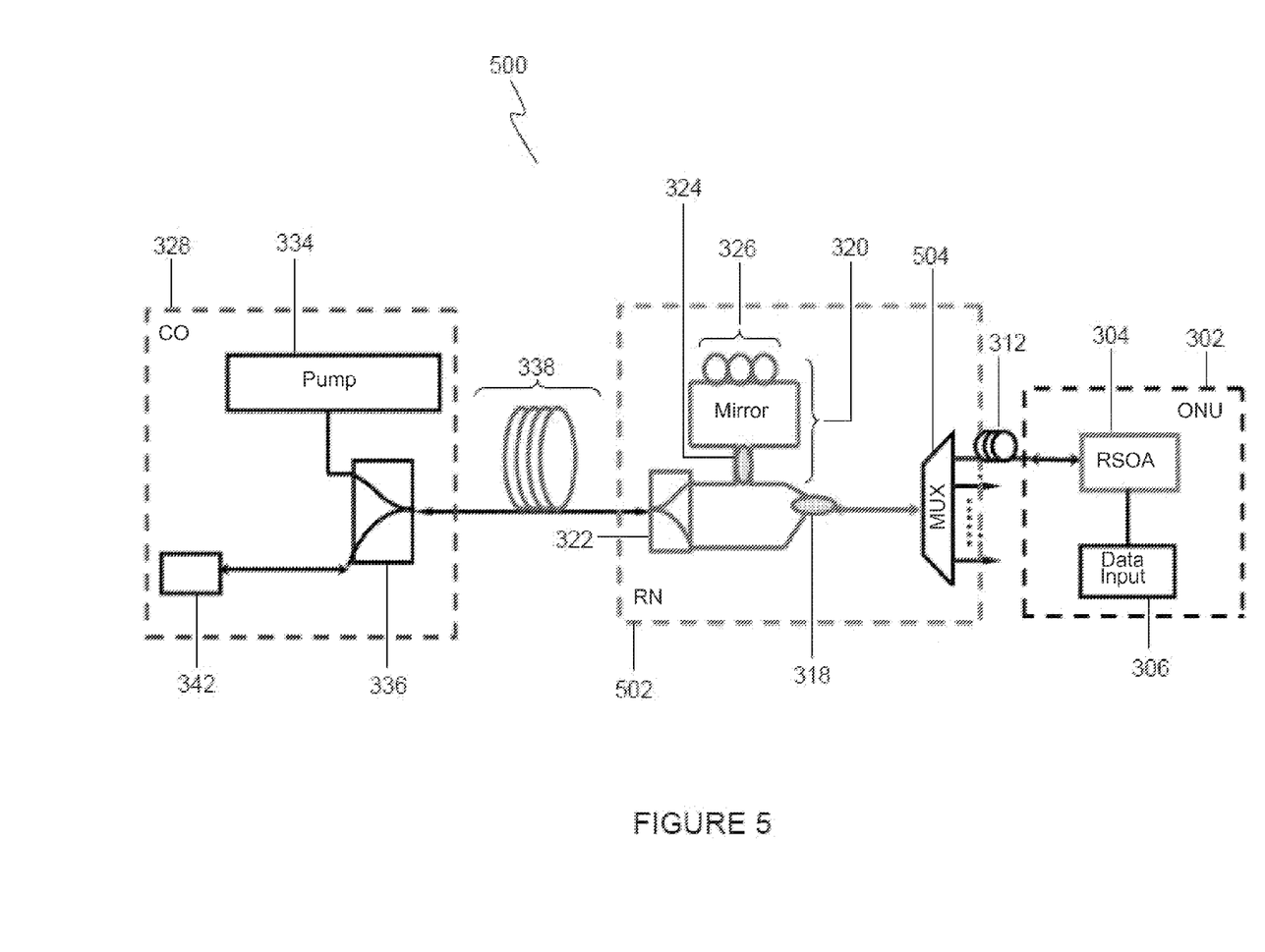
FIG. 5 shows a schematic diagram illustrating an architecture of a wavelength division multiplexed-passive optical network (WDM-PON) without downlink signals, based on self-seeded reflective semiconductor optical amplifiers (RSOAs), according to an embodiment of the present invention.

FIG. 5 shows a schematic diagram illustrating an experimental set-up 500 of a wavelength division multiplexed-passive optical network (WDM-PON) based on self-seeded reflective semiconductor optical amplifiers (RSOAs), according to another embodiment of the present invention. It should be appreciated that there are a number of individual optical network units (ONUs) present within the architecture 500 but only a single representative ONU 302 is shown for clarity and illustration purposes. The configurations of the remaining ONUs are similar to that of the representative ONU 302 as shown in FIG. 5 and the descriptions of the operation and function of the ONU 302 hereinafter apply similarly to the other remaining ONUs.

The architecture 500 of FIG. 5 is substantially similar to the architecture 300 of FIG. 3, with the exception of the absence of the downlink signals for initial measurement and validation purposes. Features or modules as illustrated in FIG. 5 that are similarly present in FIG. 3 are denoted by the same reference numbers as that for FIG. 3. As the like modules present in both the architectures 300 (FIG. 3) and 500 (FIG. 5) perform essentially the same functions as that previously described for the architecture 300, the descriptions of the functions and operations of the like modules in the architecture 500 will not be presented here.

In the example embodiment of FIG. 5, the output light of the pump 334 has a wavelength of approximately 1480 nm and the pump 334 is operated with approximately 210 mW output power. The feeder fiber 338 and the distribution fiber 312 are typical single mode fibers with lengths of 20 km and 1 km, respectively. Both the couplers 318, 324 have a coupling ratio of about 50% at the wavelength of approximately 1550 nm, while the coupling ratio of the coupler 324 at the wavelength of approximately 1480 nm is also approximately 50%. In the remote node (RN) 502, the cyclic arrayed waveguide grating (AWG) 316 (FIG. 3) that is present in the RN 314 (FIG. 3) is replaced by a 1×16 WDM multiplexer (MUX) 504, operational for 16 channels with a channel spacing of approximately 100 GHz and a bandwidth of approximately 0.6 nm. Accordingly, there are 16 individual optical network units (ONUs). The reflective semiconductor optical amplifier (RSOA) 304 has a modulation bandwidth of approximately 1.5 GHz when biased at about 80 mA. In an example embodiment, the RSOA 304 is biased at approximately 80 mA and directly modulated by the uplink data 306 having a data rate of 1.25 Gb/s.

Figure 6:
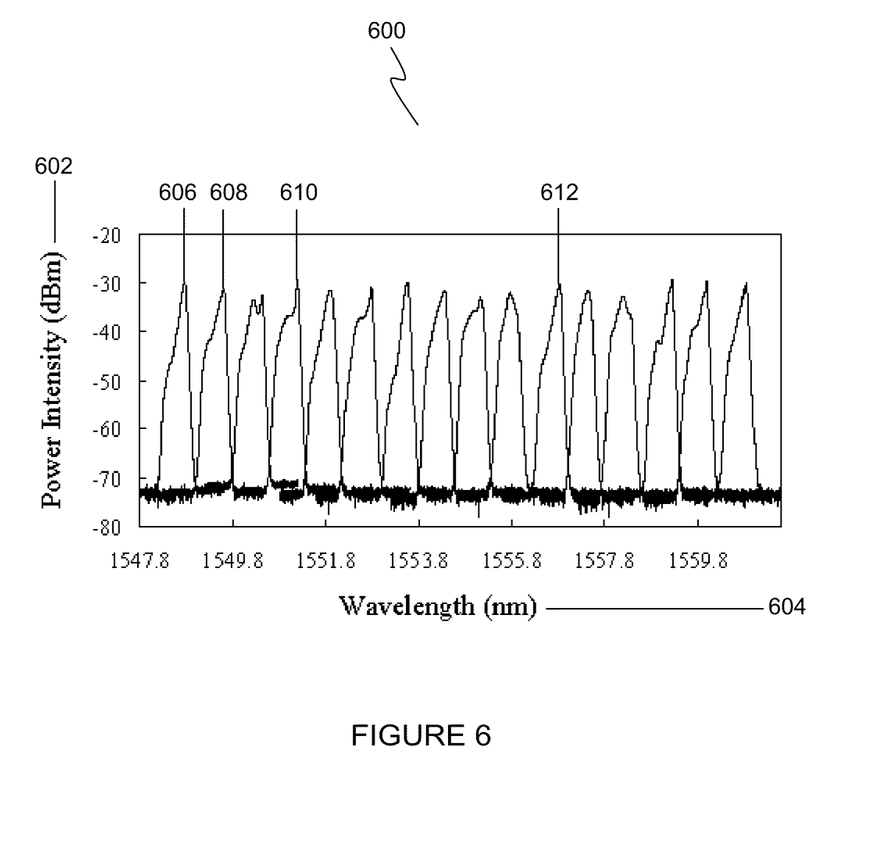
FIG. 6 shows the optical spectra of the reflective semiconductor optical amplifier (RSOA) output for the 16 channels of the embodiment of FIG. 5, after upstream transmissions.

FIG. 6 shows the optical spectra 600 of the outputs of the reflective semiconductor optical amplifiers (RSOAs) for 16 channels, e.g. 606, 608, 610, 612, of the embodiment of FIG. 5, measured in terms of the power intensity 602 as a function of the wavelength 604. FIG. 6 shows that lasing is achieved between the reflector (the loop mirror 320 (FIG. 5)) and the RSOAs, e.g. 304 (FIG. 5), for all the 16 channels, e.g. 606, 608, 610, 612, where their optical signal to noise ratios are higher than 40 dB. The relatively broad linewidth is due to the broad bandwidth of the multiplexer 504 (FIG. 5). As shown in FIG. 6, each individual channel, e.g. 606, 608, 610, 612, has a slightly different central wavelength and spectral structure. This might be due to the difference in the gain provided by the EDF 326 (FIG. 5) and the spectral intensity in the RSOAs, e.g. 304 (FIG. 5) for each individual channel, e.g. 606, 608, 610, 612.

Figure 7:
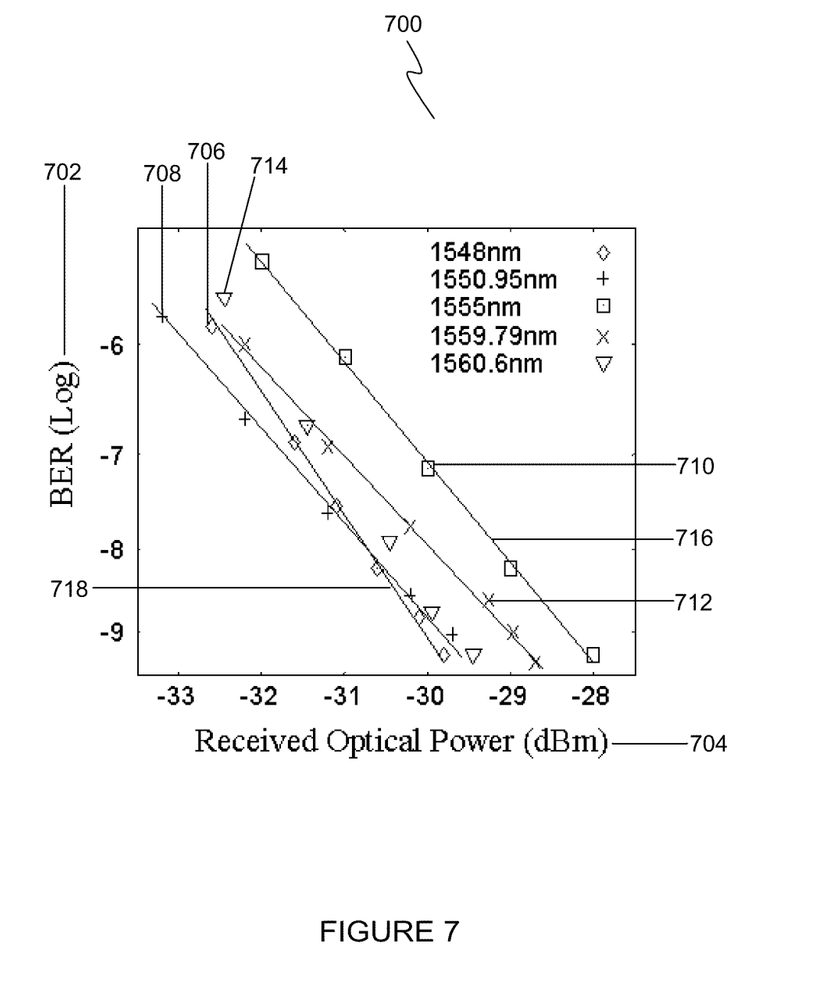
FIG. 7 shows the profile of the bit error rate (BER) as a function of the received optical power for some representative channels of the embodiment of FIG. 5, after uplink transmissions.

FIG. 7 shows the profile 700 of the bit error rate (BER) 702 as a function of the received optical power 704 for the embodiment of FIG. 5, as measured for some representative channels 706, 708, 710, 712, 714. The lines, e.g. 716, 718, are drawn for illustration purposes. The BER 702 is defined as the number of bit errors that occur to the total number of bits during a specified time interval. As shown in FIG. 7, the representative channels 706, 708, 710, 712, 714 are relatively error free after the uplink transmissions, as indicated by the BER 702 of $10^{-5}$ or less. Furthermore, the measured receiver sensitivity at the BER 702 of $10^{-9}$ is less than −28 dBm for the channels 706, 708, 710, 712, 714. Measurements of the BER for the remaining channels (not shown) similarly indicate relatively error free transmissions.

Figure 8:
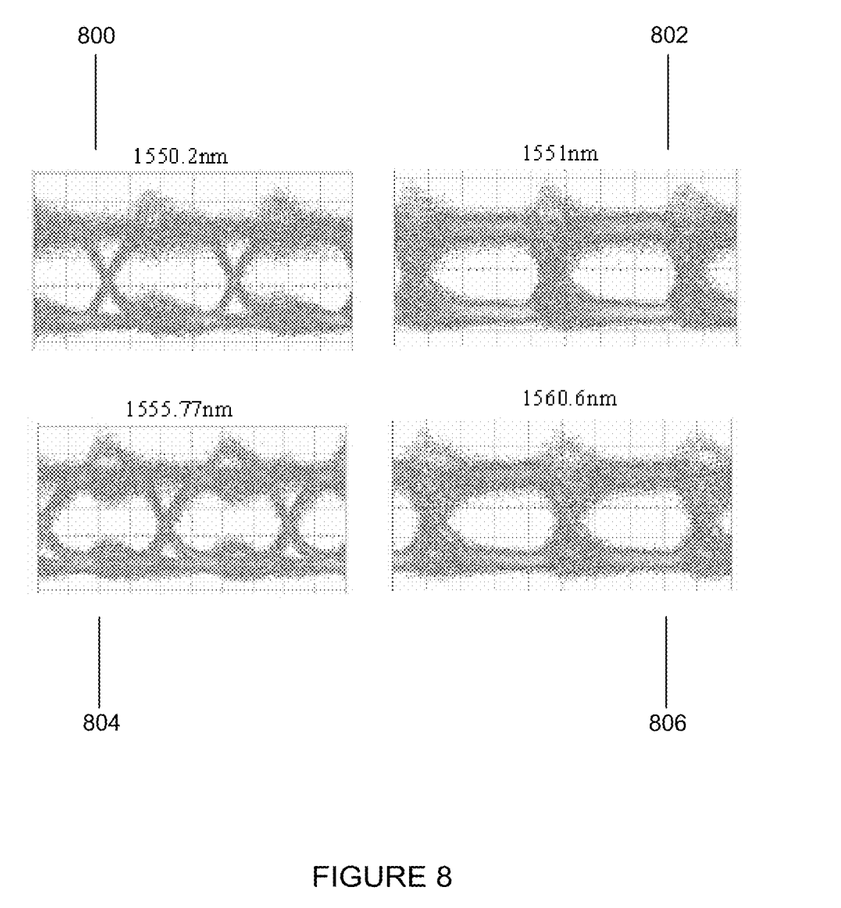
FIG. 8 shows the eye diagrams for some representative channels of the embodiment of FIG. 5, after uplink transmissions.

FIG. 8 shows the optical eye diagrams 800, 802, 804, 806 for some representative channels of the embodiment of FIG. 5, after the uplink transmissions. The measurements illustrated by FIG. 8, coupled with the measurements shown in FIGS. 6 and 7, further demonstrate the favourable performance of the uplink transmissions of the embodiment of FIG. 5. In FIG. 8, relatively clear eye openings are observed for the channels 800, 802, 804, 806, even without the use of a limiting amplifier and a clock and data recovery circuit (CDR) within the architecture 500 of FIG. 5. The measurements of FIGS. 6-8 illustrate the feasibility of the example embodiments of the present invention.

In wavelength division multiplexed-passive optical networks (WDM-PONS), the cost of the light source requires particular consideration for the practical implementation of the WDM-PONs, since each optical network unit (ONU) requires two transponders. For each ONU, one transponder is required for the downlink direction and another transponder for the uplink direction. A number of light sources have been considered, as described in the Background section including self-seeded reflective semiconductor optical amplifiers (RSOAs). Example embodiments of the present invention utilise the self-seeded RSOAs within the architectures of the WDM-PONs to provide advantageous effects.

Example embodiments of the present invention are applicable to broadband optical access networks, and particularly suitable to wavelength division multiplexed passive optical networks (WDM-PONs). One of the advantages of the example embodiments of the present invention is improved stability and better wavelength arrangement due to the absence of the fiber Bragg grating (FBG). This is because the resonant wavelengths of FBGs can vary according to changes in temperature and pressures, thereby causing instability and affecting the efficient operation of the WDM-PONs. In addition, example embodiments of the present invention allow for the remote pumping of the erbium doped fibre (EDF), thereby eliminating the need for active components such as the erbium doped fibre amplifier (EDFA) at the remote node. Active components require electrical power to operate and this may not be cost-effective for the practical implementation of WDM-PONs.

A further advantage of the example embodiments of the present invention is that remote pump located at the central office (CO) additionally provides Raman gain for the uplink and/or the downlink signals. The Raman gain helps to compensate for the relatively high insertion loss suffered by the signals.

Example embodiments of the present invention provide a number of advantageous features. These features include using self-seeded reflective semiconductor optical amplifiers (RSOAs) as the uplink light sources and locating the broadband reflector or the loop mirror at the remote node for sharing by all the channels. A laser cavity is formed between the loop mirror and the rear facet of the RSOA. In example embodiments, the residual Raman pump from the CO is used to provide optical gain at the RN and amplify optical signals within the cavity. As a result, optical feedback is generated within the laser cavity, thereby amplifying the optical signals and improving the uplink transmission performances of the WDM-PON of example embodiments.

In example embodiments, wavelength selection for each channel is achieved by the arrayed waveguide grating (AWG) via spectrum slicing of the RSOA spectrum. Furthermore, the remote node (RN) does not incorporate any active component such as an erbium doped fiber amplifier (EDFA). Instead, an erbium doped fiber (EDF), remotely pumped by the output light of the pump located at the central office (CO), is used to provide gain for the feedback signals. In addition to providing the pump light for the EDF, the pump light further provides Raman amplification for the uplink and/or the downlink signals.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A remote node for a wavelength-division-multiplexed passive optical network (WDM PON), the remote node comprising:
   means for receiving uplink optical signals from one or more optical network units of the WDM PON;
   a broadband reflector for reflecting a self-seeding portion of the respective uplink optical signals to the respective uplink light sources, the broadband reflector comprising a 4 port coupler with two output ports connected by a waveguide comprising a gain medium, wherein the waveguide comprises an Erbium doped fibre (EDF); and
   wherein the reflector comprises the gain medium and is configured for receiving a pump optical signal from a central office of the WDM PON for amplifying the self seeding portion of the respective uplink optical signal.

2. The remote node as claimed in claim 1, wherein one input port of the coupler is configured for receiving said self-seeding portions of the respective uplink optical signals.

3. The remote node as claimed in claim 2, wherein another input port of the coupler is configured for receiving the pump optical signal.

4. The remote node as claimed in claim 1, wherein the means for receiving the uplink optical signals comprises an arrayed waveguide grating.

5. A wavelength-division-multiplexed passive optical network (WDM PON) comprising:
   one or more optical network units, each optical network unit comprising an uplink light source configured to transmit an uplink optical signal;
   a remote node configured to receive the uplink optical signals from the one or more optical network units and comprising a broadband reflector for reflecting a self-seeding portion of the respective uplink optical signals to the respective uplink light sources, wherein the reflector comprises a 4 port coupler with two output ports connected by a waveguide comprising the gain medium and wherein the waveguide comprises an Erbium doped fibre (EDF); and
   a central office comprising a pump source for generating a pump optical signal and configured to transmit the pump optical signal to the remote node to pump the gain medium of the broadband reflector for amplifying said self seeding portion of the uplink optical signal.

6. A method of amplifying self-seeding portions of respective uplink optical signals in a wavelength-division-multiplexed passive optical network (WDM PON), the method comprising the steps of:
   receiving the uplink optical signals from one or more optical network units of the WDM PON at a remote node of the WDM PON;
   reflecting the respective self-seeding portions of the uplink optical signals to the respective uplink light sources by a broadband reflector comprising a 4 port coupler with two output ports connected by a waveguide comprising a gain medium, wherein the waveguide comprises an Erbium doped fibre (EDF); and
   amplifying the self seeding portions using the gain medium of the reflector and a pump optical signal received from a central office of the WDM PON.

* * * * *

UNITED STATES PATENT AND TRADEMARK OFFICE
CERTIFICATE OF CORRECTION

PATENT NO. : 8,639,119 B2
APPLICATION NO. : 12/935805
DATED : January 28, 2014
INVENTOR(S) : Wen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this
Twenty-second Day of September, 2015

Michelle K. Lee
*Director of the United States Patent and Trademark Office*